United States Patent [19]

Miller

[11] Patent Number: 5,395,519
[45] Date of Patent: Mar. 7, 1995

[54] FILTER DEVICE FOR A HYDRAULIC SYSTEM

[75] Inventor: Dean E. Miller, East Peoria, Ill.

[73] Assignee: Caterpillar Inc., Peoria, Ill.

[21] Appl. No.: 100,947

[22] Filed: Aug. 3, 1993

[51] Int. Cl.$^6$ ............................................. B01D 35/14
[52] U.S. Cl. .................................. 210/149; 210/168; 210/416.5
[58] Field of Search ..................... 210/149, 171, 416.5, 210/742, 168; 417/32; 184/6.24; 60/454

[56] References Cited

U.S. PATENT DOCUMENTS

| | | | |
|---|---|---|---|
| 4,181,611 | 1/1980 | Rubenstein | 210/149 |
| 4,306,966 | 12/1981 | Lucia | 210/85 |
| 4,388,196 | 6/1983 | Lucia | 210/742 |
| 4,783,271 | 11/1988 | Silverwater | 210/742 |

FOREIGN PATENT DOCUMENTS 135775  10/1981  Japan ..................... 417/32

*Primary Examiner*—Matthew O. Savage
*Attorney, Agent, or Firm*—John W. Grant

[57] ABSTRACT

Filter devices are useful in hydraulic systems for removing contaminants or foreign particles from the oil in the hydraulic system. One of the problems encountered with such filters is that they are subjected to high pressure drops thereacross when the oil is cold. The subject filter device of one embodiment includes a pump driven by a two-speed electric motor. When the oil temperature is below a predetermined temperature, the pump is driven at a normal speed for increased efficiency and the pressure drop across the filter is within an optimal range. When the temperature of the oil is below a predetermined temperature, the pump is driven at a low speed so that the pressure drop across the filter remains within the optimal range. In another embodiment, an electric motor driving the pump is stopped when the oil temperature is below the predetermined temperature. In a third embodiment, the pump is driven at a substantially constant speed and a laminar flow restriction is positioned upstream of the pump to induce slight cavitation when the oil viscosity is high while permitting normal fluid flow to the gear pump when the oil viscosity is low.

3 Claims, 1 Drawing Sheet

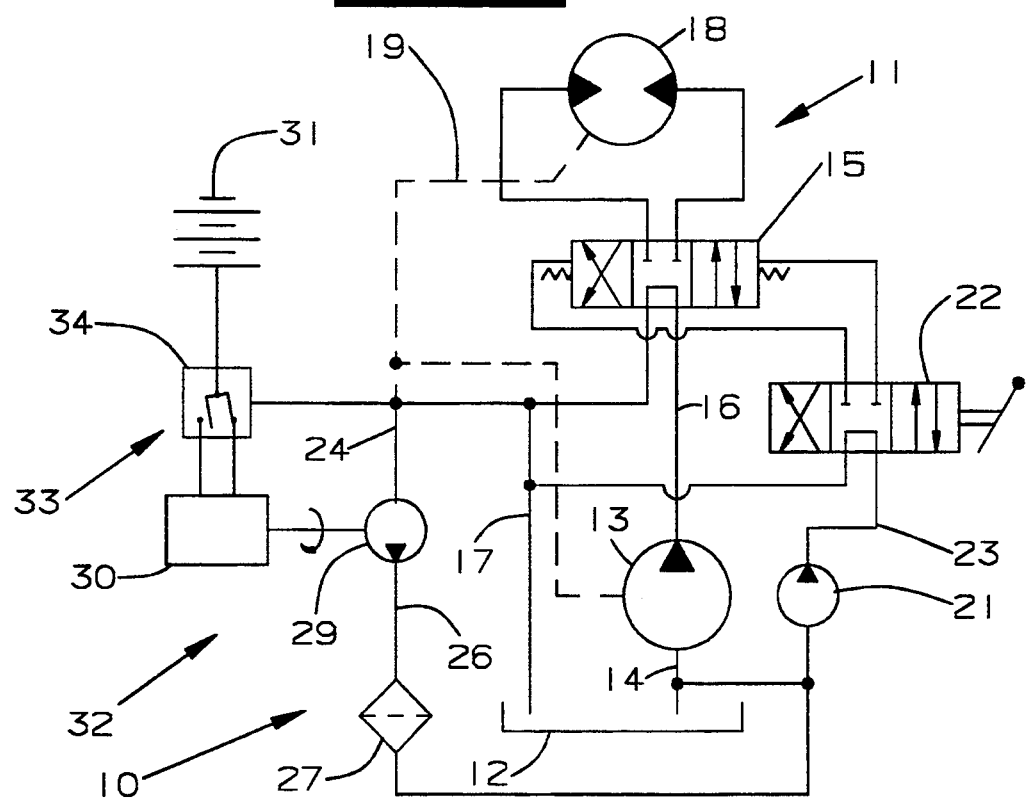
Fig_1_
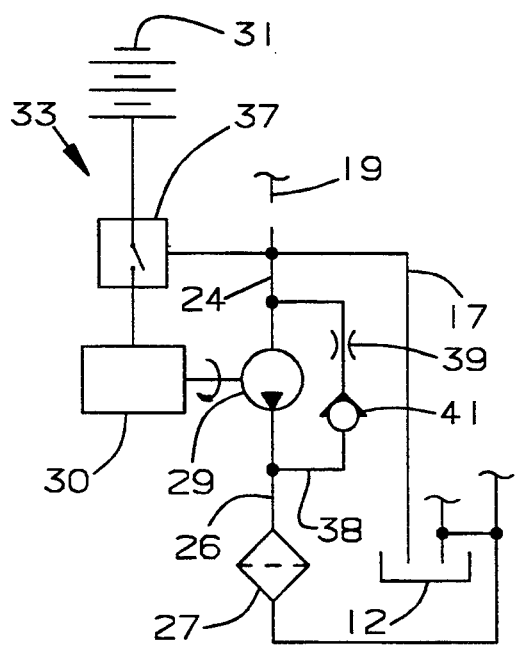
Fig_2_
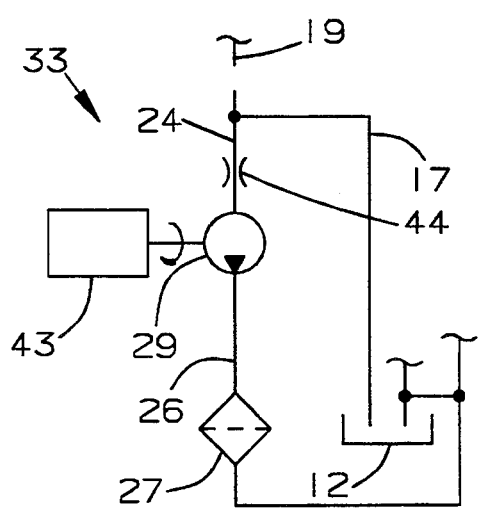
Fig_3_

FILTER DEVICE FOR A HYDRAULIC SYSTEM

TECHNICAL FIELD

This invention relates generally to a filter device for a hydraulic system and more particularly to a filter device having a dedicated pump for pumping oil through the filter.

BACKGROUND ART

Most hydraulic system have a filter device to filter contaminants and foreign particles from the oil. Some of such filtering devices have a dedicated pump whose sole function is to circulate oil from the tank through the filter and back to the tank. Heretofore, those pumps have been driven at a constant rotational speed so that the flow rate of the oil passing through the filter is fairly constant. One of the problems frequently encountered in cold weather operation is that the oil becomes quite viscous and causes a high pressure drop across the filter element until the oil warms up. The high pressure drop results in the contaminants already trapped in the filter being driven through the filter and carried into the clean oil in the tank.

Thus, it would be desirable to have a filter device for a hydraulic system wherein the pressure drop across the filter is minimized when the oil is cold while providing an optimum flow rate through the filter once the oil reaches a predetermined operating temperature.

The present invention is directed to overcoming one or more of the problems set forth above.

DISCLOSURE OF THE INVENTION

In one aspect of the present invention, a filter device for a hydraulic system having a tank containing a supply of hydraulic oil comprises a pump inlet conduit and a pump discharge conduit communicating with the tank, a filter disposed in the pump discharge conduit, a fixed displacement pump disposed between the pump inlet and pump discharge conduits to pump hydraulic oil from the pump inlet conduit through the discharge conduit and the filter, and means for reducing the output flow of hydraulic oil from the pump when the temperature of the hydraulic oil in the pump inlet conduit is below a predetermined temperature.

BRIEF DESCRIPTION OF THE DRAWINGS

FIG. 1 is a schematic illustration of an embodiment of the present invention;

FIG. 2 is a partial schematic illustration of an alternate embodiment; and

FIG. 3 is a schematic illustration of another embodiment of the present invention.

BEST MODE FOR CARRYING OUT THE INVENTION

A filter device 10 is shown in combination with a hydraulic system 11 having a tank 12 containing a supply of hydraulic oil. The hydraulic system includes a pump 13 connected to the tank through a suction conduit 14 and to a pilot operated directional control valve 15 through a supply conduit 16. The control valve 15 is connected to the tank 12 through a return conduit 17 and to a rotary hydraulic motor 18. A case drain line 19 is connected to the motor 18 and the pump 13. The hydraulic system 11 also includes a pilot pump 21 connected to the suction conduit and to a pilot control valve 22 through a pilot supply line 23. The pilot control valve 22 is connected to the return line 17 and to opposite ends of the directional control valve 15.

The filter device 10 of FIG. 1 includes a pump inlet conduit 24 connected to the case drain 19 and communicating with the tank by way of the return conduit 17, a pump discharge conduit 26 communicating with the tank, a filter 27 disposed in the pump discharge conduit 26, and a fixed displacement dedicated filter pump 29 disposed between the pump inlet and pump discharge conduits 24 and 26 to pump hydraulic oil from the pump inlet conduit through the pump discharge conduit and the filter 27. An electric motor 30 is connected to a source of electrical energy such as a battery 31 and is drivingly connected to the pump 29. The electric motor 30 has high and low operating speeds. The sole function of the filter pump is to circulate hydraulic oil through the filter 27.

A means 32 is provided for reducing the output flow of hydraulic oil from the pump 29 when the temperature of the hydraulic oil in the pump inlet conduit 24 is below a predetermined temperature. In this embodiment, the flow reducing means 32 includes a speed reducing means 33 for reducing the speed of the electric motor 39 when the temperature of the oil in the intake conduit 24 is below the predetermined temperature. The speed reducing means 33 includes a temperature responsive, two-position electric switch 34 disposed between the source of electrical energy 31 and the electric motor 30 and connected to the inlet conduit 24. The temperature responsive switch 34 has a first position directing a high speed electrical signal to the electric motor 30 to drive the electric motor at its normal high operating speed when the temperature of the oil in the inlet conduit is above the predetermined speed and a second position directing a low speed electrical signal to the motor 30 for driving the motor at its low operating speed when the temperature of the oil in the inlet conduit is below the predetermined temperature.

An alternate embodiment of a filter device of the present invention is disclosed in FIG. 2. It is noted that the same reference numerals of the first embodiment are used to designate similarly constructed counterpart elements of this embodiment. In this embodiment, however, the electric motor 30 has a single operating speed. The speed reducing means 33 includes a temperature responsive switch 37 having a first position at which an electrical signal is directed to the electric motor 30 and a second position at which the electric motor is disconnected from the source of electrical energy 31. The switch 37 is connected to the inlet conduit 24 and is biased to the first position when the temperature of the oil in the inlet conduit 24 is above the predetermined temperature and to the second position when the temperature of the oil in the inlet conduit 24 is below the predetermined temperature. A by-pass line 38 is connected to the inlet and discharge conduits 24,26 in parallel with the pump 29. An orifice 39 and a check valve 41 are serially disposed within the by-pass line 38.

Another embodiment of the filter device of the present invention is disclosed in FIG. 3. In this embodiment, the pump 29 is driven at a constant speed by a drive motor 43. The output flow reducing means 32 includes a laminar flow restriction 44 disposed in the pump inlet conduit 24. The pump 29, in this embodiment, is preferably a gear pump.

Industrial Applicability

In operation of the filter device 10 of FIG. 1, the pump 29 draws fluid from either the case drain line 19 or the return conduit 17 through the inlet conduit 24. When the temperature of the oil in the inlet conduit 24 is above a predetermined temperature, the temperature responsive switch 34 is biased to the first position such that the electric motor 30 drives the pump 29 at its normal high operating speed. When the temperature of the oil is above the predetermined temperature, the oil viscosity is low so that the pressure drop across the filter 27 is in the optimal range for efficient filtering when the pump is driven at its normal operating speed. However, when the temperature of the oil in the intake conduit 24 is below the predetermined temperature, the switch 34 is biased to its second position to direct the low speed signal to the electric motor causing it to drive the pump 29 at a lower rotational speed. This reduces the output flow of hydraulic fluid from the pump thereby reducing the volume of fluid pumped through the filter 27. The low operating speed of the pump is selected so that the pressure drop across the filter 31 remains within the optimal range even though the viscosity of the hydraulic oil is greater.

In the embodiment of FIG. 2, the electric motor 30 drives the pump 29 at its normal operating speed so long as the temperature of the oil in the inlet conduit 24 is above the predetermined temperature so that the switch 37 is in its first position. However, when the temperature of the oil is below the predetermined temperature, the switch 37 is biased to its second position disconnecting the electric motor 30 from the source of electric energy 31. This stops the electric motor and, thus, the pump 29 so that the output of the pump 29 is reduced to nothing. A limited volume of hydraulic oil passes through the orifice 39 and check valve 41 so that the oil temperature within the filter system 10 is gradually increased as the temperature of the oil in the main hydraulic system 11 increases. Raising the temperature of the oil in the inlet and discharge conduits 24,26 prior to the pump 29 being started prevents a slug of cold viscous oil from passing through the filter immediately after the pump 29 is started.

In the embodiment of FIG. 3, the output flow of the pump 29 is reduced by the laminar flow restriction 44 disposed upstream of the pump 29 when the temperature of the oil in the pump inlet conduit is below the predetermined temperature. The flow restriction 44 restricts fluid flow therethrough when the oil is cold and the viscosity is high. This causes the pump to cavitate until the oil is warmed sufficiently to permit full flow of oil to the pump 29.

The pilot system is normally more sensitive to contaminants and, in these embodiments, the oil passing through the filter 27 is directed directly to the pilot pump 21. The fluid not utilized by the pilot control valve 22 is returned to the tank 12 through the return conduit 17. In these embodiments, all of the oil passing through the case drain line 19 from the motor 18 is pumped directly through the filter 27.

In view of the above, it is readily apparent that the structure of the present invention provides an improved filter device for a hydraulic system in which the filter pump is operated at a normal operating speed when the temperature of the oil is above a predetermined temperature and the viscosity of the oil is low and reduces the output flow of the pump when the temperature of the oil is below the predetermined temperature and the viscosity of the oil is high. When the oil temperature is above the predetermined temperature, the output flow from the pump is sufficient to maintain the pressure drop across the filter at its optimum range for efficient filtering of contaminants from the oil. When the oil viscosity is high, reducing the output flow from the pump results in the pressure drop across the filter being maintained at its optimum range.

Other aspects, objects and advantages of this invention can be obtained from a study of the drawings, the disclosure and the appended claims.

I claim:

1. A hydraulic system having a primary pump connected to a tank containing a supply of hydraulic oil, the improvement comprising:
   a pump inlet conduit communicating freely with the tank;
   a pump discharge conduit communicating directly with the tank;
   a filter disposed in the pump discharge conduit;
   a fixed displacement pump disposed between the inlet and discharge conduits to pump hydraulic oil from the inlet conduit through the discharge conduit and the filter;
   a source of electrical energy and an electric motor drivingly connected to the fixed displacement pump; and
   a temperature sensor switch for controlling the speed of said electric motor in response to the temperature of the oil in the pump inlet conduit, the temperature sensor switch acting to reduce the speed of the electric motor and the output flow from the fixed displacement pump through the filter when the temperature of the hydraulic oil in said inlet conduit is below a predetermined temperature.

2. The fluid filter device of claim 1 wherein the electric motor has high and low operating speeds, the motor being driven at the high operating speed when the oil temperature in the inlet conduit is above the predetermined temperature and at the low operating speed when the oil temperature in the inlet conduit is below the predetermined temperature.

3. The fluid filter device of claim 2 wherein said switch has a first position directing a high speed electrical signal to the electric motor when the oil temperature in the inlet conduit is above the predetermined temperature and a second position directing a low speed electrical signal to the electric motor when the oil temperature in the inlet conduit is below the predetermined temperature.

* * * * *

UNITED STATES PATENT AND TRADEMARK OFFICE
CERTIFICATE OF CORRECTION

PATENT NO. : 5,395,519

DATED : March 7, 1995

INVENTOR(S) : Dean E. Miller and David C. Orr

It is certified that error appears in the above-indentified patent and that said Letters Patent is hereby corrected as shown below:

On the title page, under item [19], add -- et al.-- after "Miller".

On the title page, item [75], after "Ill." add --David C. Orr, Dunlap, Ill.--.

Signed and Sealed this

Fifth Day of September, 1995

Attest:

BRUCE LEHMAN

Attesting Officer     Commissioner of Patents and Trademarks